United States Patent [19]

Heinrich et al.

[11] Patent Number: 5,315,225
[45] Date of Patent: May 24, 1994

[54] CONVERTER FOR SYNCHRONOUS MOTOR STARTING

[75] Inventors: Theodore M. Heinrich; Colin D. Schauder, both of Murrysville, Pa.

[73] Assignee: Electric Power Research Institute, Palo Alto, Calif.

[21] Appl. No.: 755,796

[22] Filed: Sep. 30, 1991

[51] Int. Cl.⁵ ............................................. H02P 1/46
[52] U.S. Cl. ................................... 318/712; 318/705; 318/714
[58] Field of Search ............... 318/723, 722, 798, 254, 318/802, 721, 717, 700, 712, 719, 713, 714, 705

[56] References Cited

U.S. PATENT DOCUMENTS

| | | | |
|---|---|---|---|
| 3,840,799 | 10/1974 | Macko et al. | 321/18 |
| 4,160,938 | 7/1979 | Akamatsu | 318/722 |
| 4,172,991 | 10/1979 | Akamatsu et al. | 318/722 |
| 4,246,528 | 1/1981 | Nakajima | 318/722 |
| 4,250,435 | 2/1981 | Alley et al. | 318/254 |
| 4,258,415 | 3/1981 | Török | 363/64 |
| 4,258,416 | 3/1981 | Walker et al. | 318/722 |
| 4,271,385 | 6/1981 | Azusawa | 318/722 |
| 4,276,504 | 6/1981 | Nagase et al. | 318/802 |
| 4,327,314 | 4/1982 | Hosokawa et al. | 318/713 |
| 4,413,216 | 11/1983 | Knuth | 318/721 |
| 4,441,063 | 4/1984 | Roof et al. | 318/722 |
| 4,450,395 | 5/1984 | Kawamura et al. | 318/720 |
| 4,460,860 | 7/1984 | Schwesig et al. | 318/721 |
| 4,460,861 | 7/1984 | Rosa | 318/717 |
| 4,511,834 | 4/1985 | Studtmann | 318/717 |
| 4,511,835 | 4/1985 | Studtmann | 318/700 |
| 4,565,956 | 1/1986 | Zimmermann et al. | 318/722 |
| 4,565,957 | 1/1986 | Gary et al. | 318/723 |
| 4,628,240 | 12/1986 | Kurakake et al. | 318/723 |
| 4,629,968 | 12/1986 | Kurakake et al. | 318/723 |
| 4,654,572 | 3/1987 | Hirata | 318/723 |
| 4,682,094 | 7/1987 | Kuroiwa | 318/722 |
| 4,743,825 | 5/1988 | Nashiki | 318/722 |
| 4,761,599 | 8/1988 | Yasunobu et al. | 318/723 |
| 4,804,900 | 2/1989 | Soeda | 318/719 |
| 4,833,387 | 5/1989 | Pfeiffer | 318/723 |

FOREIGN PATENT DOCUMENTS 3042819 6/1982 Fed. Rep. of Germany.
3709168 9/1988 Fed. Rep. of Germany.

Primary Examiner—William M. Shoop, Jr.
Assistant Examiner—John W. Cabeca
Attorney, Agent, or Firm—Poms, Smith, Lande & Rose

[57] ABSTRACT

A converter for synchronous motor starting rectifies the input voltage from a polyphase input power source to develop a starting current having a substantial DC component. The starting current is then sequentially applied to each of the phase windings in the synchronous motor, with the sequential rate of application occurring at a continuously increasing frequency. The angular velocity of the motor synchronously increases with the increasing frequency of the sequential rate of application of the starting current to the phase windings. By application of the starting current at an increasing frequency, the synchronous motor operates in a forced commutation mode. The starting current is removed when the angular velocity of the motor is synchronous with the constant frequency of the polyphase input power source. When the starting current is removed, and the motor is synchronous with the input power, the input power may then be applied directly to the motor in a natural commutation mode.

5 Claims, 4 Drawing Sheets

CONVERTER FOR SYNCHRONOUS MOTOR STARTING

FIELD OF THE INVENTION

The present invention relates generally to synchronous motors and, more particularly, to a novel converter which converts polyphase input power to a starting current wherein the starting current is applied sequentially to each phase winding of the synchronous motor with the rate of application being at a continuously increasing frequency so that the angular velocity of the synchronous motor increases synchronously with the increasing frequency. The novel converter of the present invention is one novel type of current source inverter.

BACKGROUND

Alternating current (AC) motors are widely used in industry to drive rotating machinery. The vast majority of these applications require the motor to run at a constant angular velocity corresponding to the frequency of the input AC power. At present, the number of induction motors in commercial use exceeds the number of synchronous motors used for the same type of duty. There are two primary reasons for the preference of induction motors over synchronous motors. Compared to synchronous motors, induction motors exhibit ruggedness and simplicity in their design. Induction motors also have the ability to be started by direct connection to the AC power line.

Notwithstanding the above mentioned benefits of the induction motor over the synchronous motor, there are certain favorable attributes of synchronous motors which suggest that they should be used instead of induction motors. For example, synchronous motors have greater efficiency than induction motors. This is particularly true of permanent magnet synchronous motors which have no electrical power losses in the rotor. Suitable permanent magnet rotors are currently being developed for this purpose. Although the cost of such a type of synchronous motor would exceed the cost of a conventional induction motor, it should be possible to recover the cost differential over a period of time in the form of energy savings.

However, despite the advantageous attributes of the synchronous motor, a primary limitation and disadvantage of the synchronous motor and, in particular, permanent magnet synchronous motors, is the inherent difficulty of starting the synchronous motor. For example, the direct on-line starting process routinely used for induction motors produces extremely large oscillating torques in the permanent magnet synchronous motor. These oscillating torques do occur in induction motors, but are not so large as to cause mechanical failure. However, it has been found that these oscillating torques may be large enough to cause structural damage to the permanent magnet synchronous motors or the machinery driven thereby. Yet another limitation of the direct on-line starting of a permanent magnet synchronous motor is the undesirable, large, asynchronous current components induced in the AC power lines during start up.

To overcome these disadvantages and limitations of synchronous motors, some prior art synchronous motors have been provided with windings on the rotor wherein the windings provide induction motor reaction for starting directly on-line. These rotor windings also provide a damping action when the motor is running synchronously. A significant disadvantage and limitation of this type of synchronous motor is that the rotor windings significantly add to the complexity and cost of the motor, thereby negating benefits gained by increased efficiency.

SUMMARY OF THE INVENTION

The converter of the present invention functions as a current source inverter to achieve variable increasing frequency starting of the synchronous motor. According to the present invention, the novel converter rectifies the input voltage from a polyphase input power source to develop a starting current having a substantial DC component. The starting current is then sequentially applied to each of the phase windings in the synchronous motor, with the sequential rate of application occurring at a continuously increasing frequency. The angular velocity of the motor synchronously increases with the increasing frequency of the sequential rate of application of the starting current to the phase windings.

The motor phase current is switched or commutated from phase to phase by two methods:

a. At low motor speed, where the motor phase voltage is low, the phase current is interrupted by the control of the converter in combination with the input voltage.

b. At higher speeds, where the motor phase voltage has attained a reasonable value, the current is commutated from phase-to-phase by the motor voltage.

The starting current is removed when the angular velocity of the motor is synchronous with the constant frequency of the polyphase input power source. When the starting current is removed, and the motor is synchronous with the input power, the input power may then be applied directly to the motor in a natural commutation mode.

In one embodiment of the present invention, wherein the input power source is a typical three phase source, three first thyristors are used to rectify the input power. An anode of each of the thyristors has a respective phase of the input power applied thereto. The cathodes of each of these thyristors are coupled in common. A controller develops first gate signals, wherein each gate signal is applied to the gate of a respective one of the thyristors to achieve the proper rectification in accordance with the present angular velocity of the motor. Three second thyristors each have their cathodes coupled to a respective phase of the synchronous motor. The anodes of each of the second thyristors are coupled in common to the commonly connected cathodes of each of the first thyristors. The controller develops second gate signals to sequentially turn on the second thyristors. The starting current is thus applied sequentially to each respective phase of the motor through the second thyristors, with the rate of application occurring at an increasing frequency. The angular velocity of the synchronous motor then increases synchronously with the increasing frequency of the sequential rate of application of the starting current.

An advantage of the present invention is that the novel converter may be constructed in modular form so that it may be removed from the synchronous motor after it has been started. The converter does not form part of the synchronous motor construction, as do the prior art rotor windings, thereby not adding to the cost of the motor. The converter of the present invention may accordingly be transported to another location to start another motor.

These and other advantages, objects and features of the present invention will become readily apparent to those skilled in the art from the study of the following description of exemplary preferred embodiments when read in conjunction with the attached drawings, wherein:

DESCRIPTION OF EXEMPLARY PREFERRED EMBODIMENT

Figure 1:
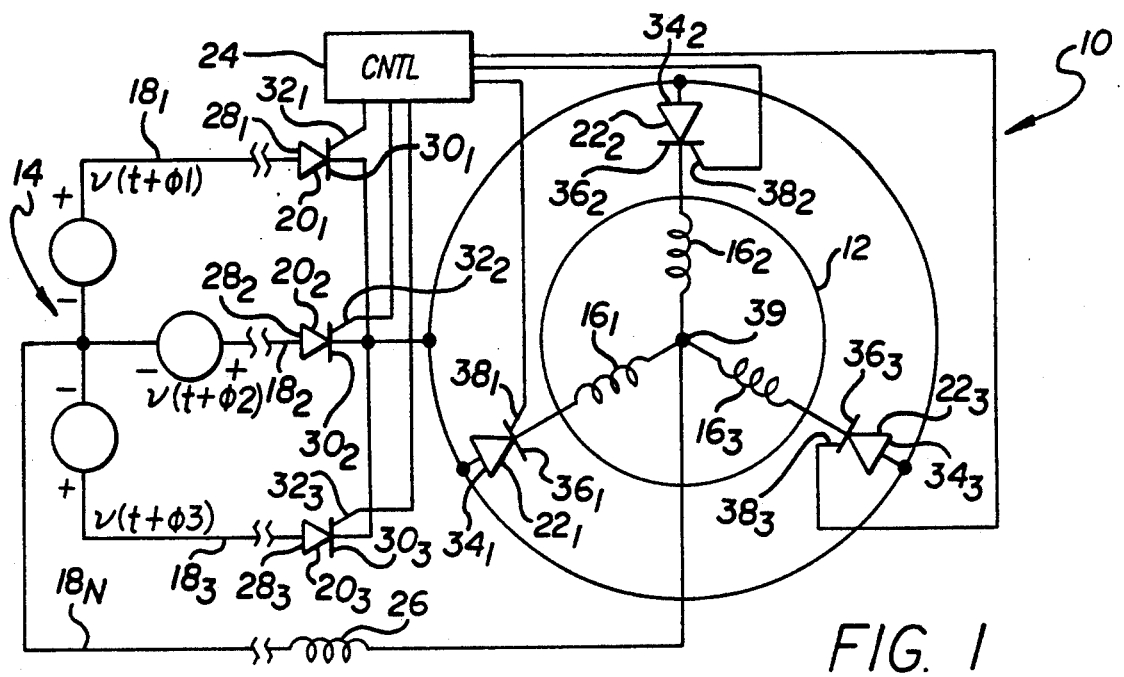
FIG. 1 is a schematic representation of a converter, constructed according to the principles of the present invention, for starting of synchronous motors.

With reference to FIG. 1, there is shown a schematic diagram of a converter 10 constructed according to the principle of the present invention. As will be described in greater detail hereinbelow, the converter 10 is a current source inverter for starting a three phase synchronous motor 12 from a three phase input power source 14. The three phase motor 12 has a first phase winding $16_1$, a second phase winding $16_2$ and a third phase winding $16_3$. The power source 14 has a first mainline $18_1$, a second mainline $18_2$ and a third mainline $18_3$. The first mainline $18_1$ carries a first phase voltage, the second mainline $18_2$ carries the second phase voltage and the third mainline $18_3$ carries the third phase voltage. With this environment of the present invention described, the converter 10 of the present invention is described immediately hereinbelow. It is to be noted that the principles of the present invention are not limited to the three phase environment, which is the most common, but are also applicable to other polyphase environments.

In the first exemplary embodiment of the present invention shown in FIG. 1, the converter 10 includes a plurality of first thyristors $20_{1-3}$, a plurality of second thyristors $22_{1-3}$, a controller 24 and a neutral reactor 26. Each of the first thyristors $20_{1-3}$ has an anode $28_{1-3}$, a cathode $30_{1-3}$ and a gate $32_{1-3}$. Similarly, each of the second thyristors $22_{1-3}$ has an anode $34_{1-3}$, a cathode $36_{1-3}$ and a gate $38_{1-3}$.

The anodes $28_{1-3}$ of each of the first thyristors $20_{1-3}$ are adapted to be electrically coupled to a respective one of the mainlines $18_{1-3}$ of the input power source 14. The cathodes $30_{1-3}$ of the first thyristors $20_{1-3}$ are electrically coupled in common. The anodes $34_{1-3}$ of each of the second thyristors $22_{1-3}$ are electrically coupled in common to each other and in common to the cathodes $30_{1-3}$ of the first thyristors $20_{1-3}$. The cathodes $36_{1-3}$ of the second thyristors $22_{1-3}$ are adapted to be coupled electrically to a respective phase winding $16_{1-3}$ of the synchronous motor 12. The gates $32_{1-3}$ of the first thyristors $20_{1-3}$ are electrically coupled to the controller 24. Similarly, the gates $38_{1-3}$ of the second thyristors $22_{1-3}$ are also electrically coupled to the controller 24.

The controller 24 develops first gate current control signals and second gate current control signals. Each of the first gate signals are applied to a respective one of the gates $32_{1-3}$ of the first thyristors $20_{1-3}$. Each of the second gate signals are applied to a respective one of the gates $38_{1-3}$ of the second thyristors $22_{1-3}$. In response to the first gate signals, the first thyristors $20_{1-3}$ rectify the first, second and third phase voltages at a respective one of the mainlines $18_{1-3}$. As a process of the rectification, the first thyristors $20_{1-3}$ develop a starting current which is the sum of all the currents through the thyristors $20_{1-3}$ at their commonly connected cathodes $30_{1-3}$.

The second gate current signals from controller 24 are sequentially developed at a continuously increasing frequency such that each of the second thyristors $22_{1-3}$ are sequentially turned on and off at a continuously increasing rate. When each second thyristor $22_{1-3}$ is turned on, it applies a starting current to the respective one of the phase winding $16_{1-3}$ coupled thereto. Accordingly, with the starting current coupled to one of the phase windings $16_{1-3}$, the angular velocity of the motor 12 increases synchronously with the increasing frequency of the second gate signals.

The neutral reactor 26 is coupled in series between a star point node 39 and a neutral line 18N of the power source 14. The neutral reactor 26 serves to attenuate current pulsations which are the result of voltage harmonics produced by the rectification of the mainlines $18_{1-3}$ by the thyristor $20_{1-3}$.

Once the angular velocity the motor 12 is synchronous with the constant frequency of the power source 14, the starting current is removed. The motor 12 may then be connected directly to the power source 14.

Figure 2:
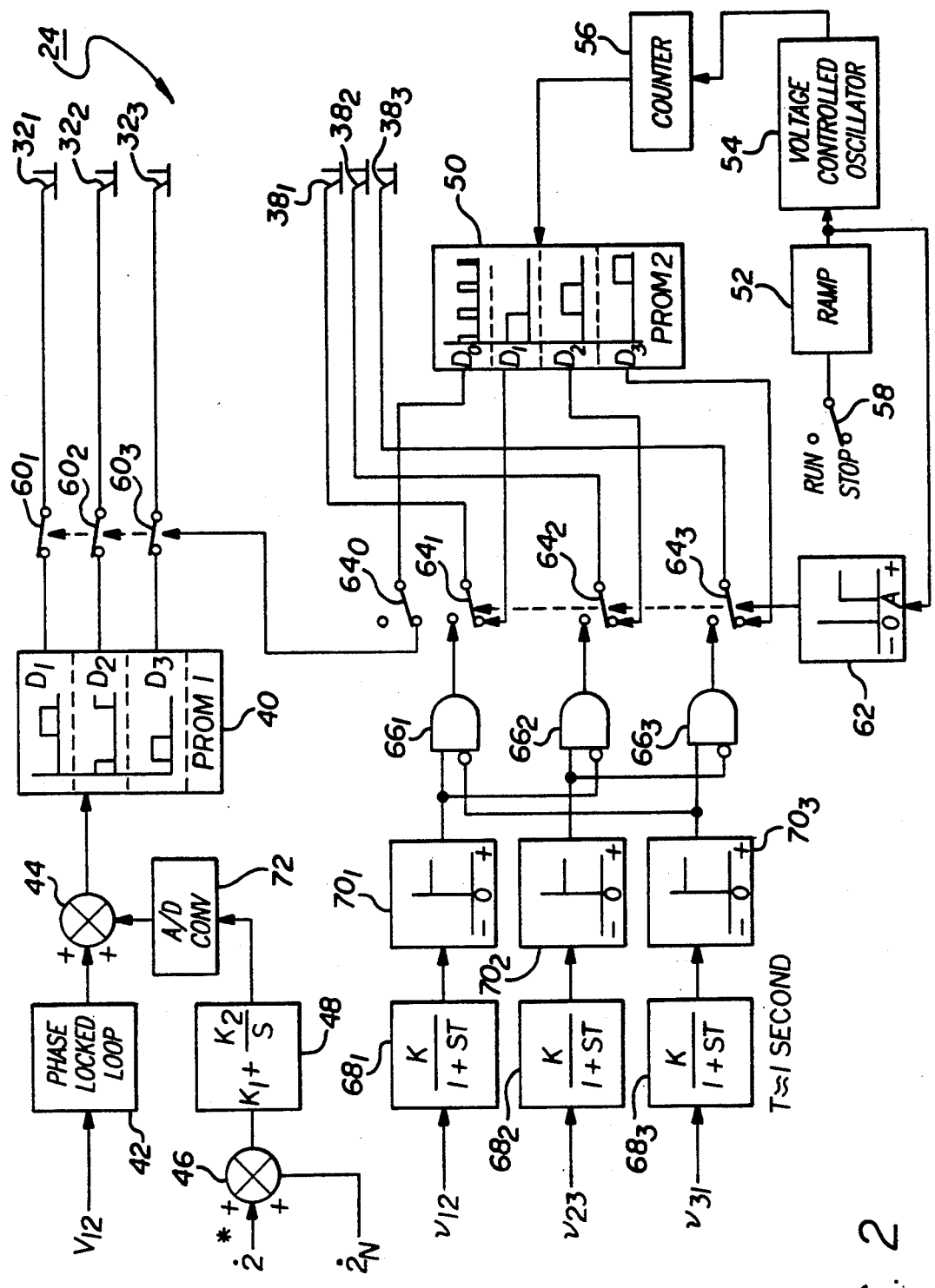
FIG. 2 is a schematic block diagram of the controller shown in FIG. 1.

With reference to FIG. 2, there is shown a schematic block diagram of the controller 24 of FIG. 1. The first gate current signals which are applied to the gates $32_{1-3}$ of the first thyristor $20_{1-3}$ are developed by a first programmable read-only memory (PROM) 40. The first PROM 40 has three data outputs $D_{1-3}$. Each output $D_{1-3}$ sequentially goes high at a rate commensurate with the constant frequency of the input power source 14. The duration which each output $D_{1-3}$ goes high is 30° out of phase with the peak voltage of the voltage phase of a respective one of the mainlines $18_{1-3}$. other phase angles could be used. Thus, each of the first thyristors $20_{1-3}$ will be made conductive by the appropriate first control current signal applied to its respective gate thyristor $32_{1-3}$ to provide rectification to develop the starting current.

To clock the first PROM 40, a potential difference $V_{12}$ is taken between two voltage phases of the power source 14, with this potential difference being applied to a phase locked loop (PLL) 42. For example, the potential difference $V_{12}$ may be taken between the voltage $v(t+\phi_1)$ and the voltage $v(t+\phi_2)$ respectively on mainline $18_1$ and mainline $18_2$. The output of the phase locked loop 42, which is the digital angular output of its internal counter (not shown as this element is well known in the art), is applied to a first summer 44. A second summer 46 has a constant current reference $i^*$ and a measured current $i_N$ applied thereto wherein the measured current is the current along the neutral line $18_N$ of the power source 14. The second summer 46 adds the negative of the measured neutral current $i_N$ with the constant current reference $i^*$. The output of the second summer 46 is then applied to a filter 48 which has a transfer function $k_1 + k_2/S$. The output of the filter 48 is applied to an analog-to-digital (A/D) converter 72. The output of the A/D converter 72 therefore represents, in digital format, the filtered current error signal $(i - i_N)$. This digital signal is added to the digital angular output of the phase lock loop element 42 by summer 44. The output of summer 44 forms an address for the lookup table which resides in first PROM 40. The corresponding data output of first PROM 40 forms the gate drive signals for thyristors $32_{1-3}$.

To develop the second gate control signals for application to the gates $38_{1-3}$ of the second thyristors $22_{1-3}$, a second PROM 50 develops such signals in sequence. The outputs $D_{1-3}$ of the second PROM 50 sequentially go high. To increase the rate at which these signals are developed and applied to the phase windings $16_{1-3}$, the second PROM 50 is clocked at a constantly increasing rate. To clock the second PROM 50, a ramp voltage generator 52, voltage controlled oscillator (VCO) 54 and a counter 56 are used.

To start the motor 12, a switch 58 is triggered from a stop position to a run position. This causes the ramp voltage generator 52 to develop a linearly increasing voltage with respect to time. This linearly increasing voltage is applied to the VCO 54. As is well known in the art, the output of the VCO 54 is a constant amplitude voltage having a frequency which is function of the level of the input DC voltage. As the level of the input DC voltage increases, the frequency of the VCO output correspondingly increases. The output of the VCO 54 is then applied to a counter 56 which develops the clock signal for application to the second PROM 50. The clock signal frequency provides the second address for accessing the second PROM 50, and increases at a constant rate. Therefore, the outputs $D_{1-3}$ go high at a constantly increasing rate to trigger the respective one of the second thyristors $22_{1-3}$.

Initially at start-up, each phase winding $18_{1-3}$ will carry the full starting current in sequence. At the end of the conduction period for one phase winding $18_n$, the starting current in that phase winding is extinguished so that the starting current can reappear in the next sequential phase winding $18_{n+1}$. When the angular velocity of the motor 12 is below a preselected angular velocity, the starting current must be inhibited between the successive conduction periods of each of the phase windings $18_{1-3}$.

Accordingly, the second PROM 50 develops a pulse at its output $D_0$ occurring at the transition when each other output $D_{1-3}$ sequentially goes high. This pulse is applied to a plurality of switches $60_{1-3}$. Each of the switches $60_{1-3}$ is connected in series between one of the outputs $D_{1-3}$ of the first PROM 40 and a respective one of the gates $32_{1-3}$ of the first thyristors $20_{1-3}$. When the pulse goes high at the output $D_0$, the switch opens, thereby removing the first control signal from the first thyristors $20_{1-3}$. It is to be noted that this pulse is not synchronous with the outputs of the $D_{1-3}$ of the first PROM 40.

At a time when the frequency of application of the starting current to the phase windings $18_{1-3}$ indicates that the angular velocity of the motor 12 is above the preselected angular velocity, the ramp voltage 52 is also above a selected voltage. Accordingly, the ramp voltage is applied to gate 62. The gate 62 output goes high when the voltage developed by the ramp generator 52 is above the preselected voltage. When the voltage of the gate 62 goes high, a plurality of switches $64_{0-3}$ are opened thereby disconnecting the outputs $D_{0-3}$ of the second memory 50 from operation within the controller 24. Thus, the switches $60_{1-3}$ remain closed so that there is no interruption of the first gate control signals.

Above the preselected angular velocity, the motor 12 may then be operated in a direct commutation mode. To develop the second gate control signals in the direct commutation mode, the switches $64_{1-3}$ then connect the outputs of gates $66_{1-3}$ to a respective one of the gates $38_{1-3}$ of the second thyristors $22_{1-3}$. The gates $66_{1-3}$ are controlled so that their outputs go sequentially high during the outgoing conduction period of one of the phase windings $18_{1-3}$ to initiate the conduction period of the incoming next phase winding $18_{1-3}$.

To control the gates so that their outputs sequentially go high at the correct moment relative to the motor terminal voltage, the differential voltage between the phase windings $18_{1-3}$, $V_{12}$, $V_{23}$, $V_{31}$ are measured. Each of the differential winding voltages $V_{12}$, $V_{23}$, $V_{31}$ are applied to a respective one of filters $68_{1-3}$. Each of the filters $68_{1-3}$ has a transfer function in the form of $k/(1+sT)$, wherein T is approximately one second. The output of the filters $68_{1-3}$ is then applied to a respective one of gates $70_{1-3}$. The output of the gates $70_{1-3}$ goes high whenever the input coupled thereto is high.

As best seen in FIG. 2, the outputs of the gates $70_{1-3}$ are cross-coupled to the inputs of the gates $66_{1-3}$. Each of the gates $70_{1-3}$ outputs are electrically coupled to a non-inverting input of a respective one of the gates $66_{1-3}$ Furthermore, the output of each of the gates $70_{1-3}$ is coupled to the inverting input of the next one in the sequence of the gates $66_{1-3}$. For example, the output of gate $70_1$ is coupled to the inverting input of gate $66_{21}$ and so forth. Thus, the outputs of gates $66_{1-3}$ then drive the motor in a natural commutation mode. In the natural commutation mode one of the second thyristors $22_{1-3}$ is fired while a respective one of the phase windings $18_{1-3}$ coupled thereto has a voltage lower than that of the voltage on the outgoing conduction period of the previous one of the phase windings $18_{1-3}$.

Figure 3A:
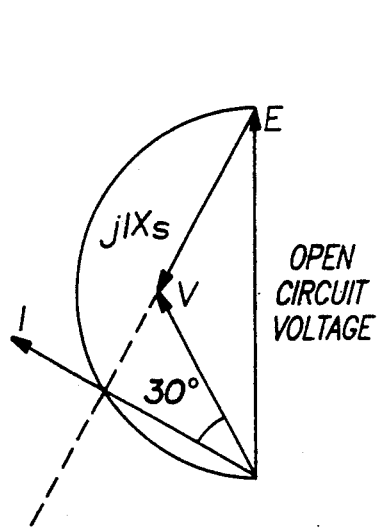
FIGS. 3 and 3B are phasor diagrams showing the natural commutation mode and the forced commutation mode respectively.
Figure 3B:
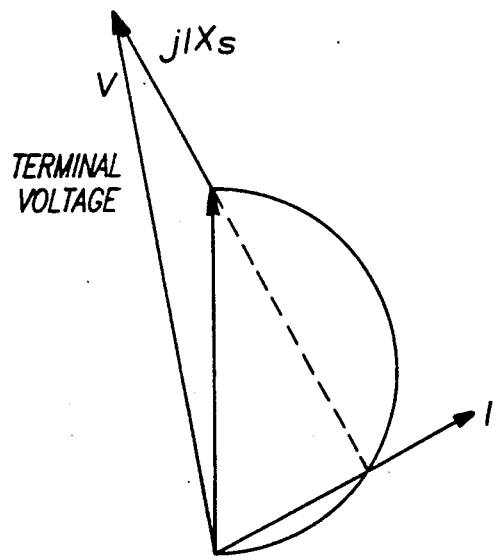
Figure 4:
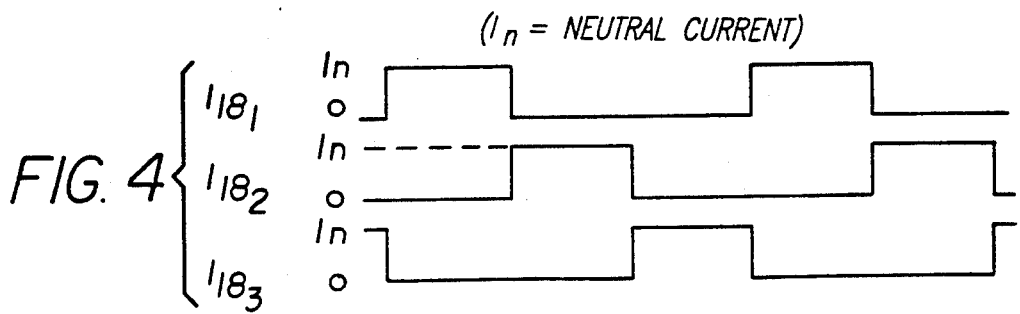
FIG. 4 is a waveform illustrating the idealized current through the synchronous motor.
Figure 5:
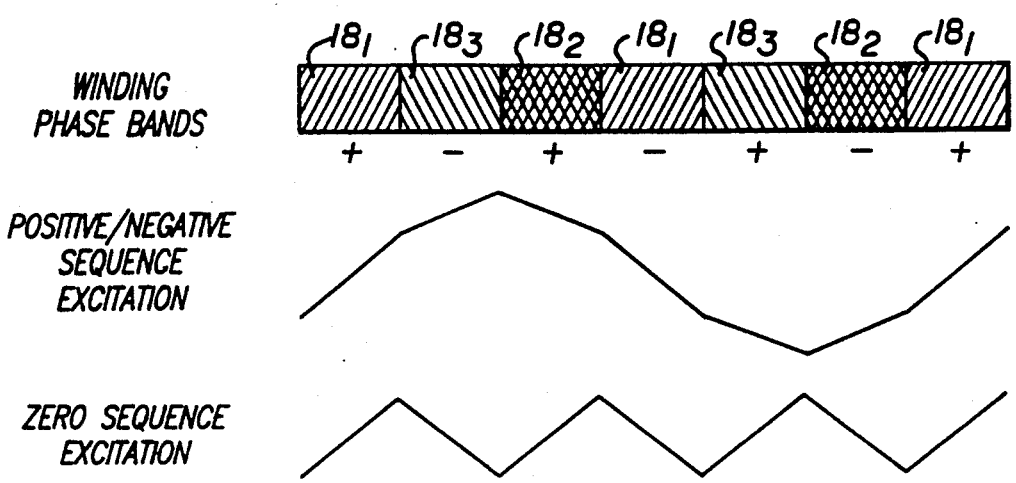
FIG. 5 are waveforms useful in explaining the operation of the converter of the present invention.

With further reference to FIGS. 3–5, the phasor diagrams of the synchronous motor 12 during the operation of the natural commutation mode and the force commutation mode are shown. In FIG. 4, an idealized representation of the current waveforms through each of the phase windings $18_{1-3}$ are shown. It can be seen that there is a large zero sequence DC component in the excitation.

In FIG. 5, the spacial MMF distribution in a three phase winding is illustrated for the case of zero sequence excitation. Excitation of this kind produces no fundamental pole number MMF distribution but a large third harmonic spacial distribution. This third harmonic component theoretically produces no net torque by interaction with the rotor born flux which should have a fundamental pole number. It will produce some torque by induction motor action due to the rotor cage, although this will fall rapidly as soon as the rotor begins to move. The proposed excitation waveform produces more than twice the thermal loss in the winding compared with pure sinusoidal excitation, but this is considered acceptable for the short duration duty cycle for motor starting.

It is intended that the converter 10 described hereinabove is only used to accelerate the motor to an angular velocity which is synchronous with the frequency of the power source 14. At that point, other circuitry (not shown) should be used to inhibit the firing of all thyristors and then close a bypass conductor connecting the motor 12 to the AC lines $18_{1-3}$ at the correct time. The converter 10, including the neutral reactor 26, can then in principle be released from the motor 12 for use on another motor which needs to be started.

Figure 6:
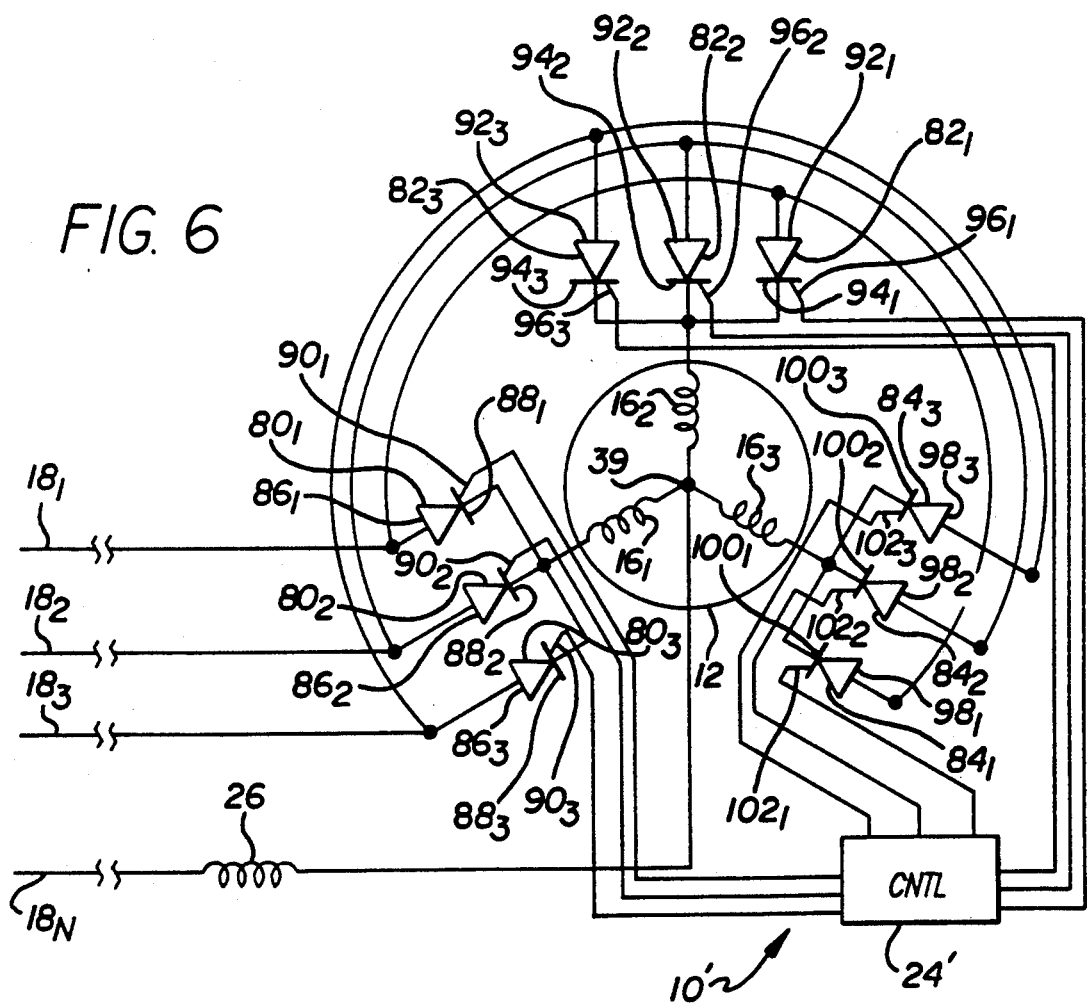
FIG. 6 is an alternate embodiment of the converter for starting of synchronous motors.

With reference now to FIG. 6, there is shown a first alternative embodiment 10' of a converter constructed according to the principles of the present invention. The converter 10' includes a plurality of first thyristors $80_{1-3}$, a plurality of second thyristors $82_{1-3}$, a plurality of third thyristors $84_{1-3}$, a controller 24' and the above described neutral reactor 26.

Each of the first thyristors $80_{1-3}$ have an anode $86_{1-3}$ a cathode $88_{1-3}$ and a gate $90_{1-3}$. Similarly, the second thyristors $82_{1-3}$ have an anode $92_{1-3}$, a cathode $94_{1-3}$ and a gate $96_{1-3}$. Finally, the third thyristors $84_{1-3}$ have an anode $98_{1-3}$, a cathode $100_{1-3}$ and a gate $103_{1-3}$.

The cathodes $88_{1-3}$ of each of the first thyristors $80_{1-3}$ are electrically connected in common and also electrically coupled to the first phase winding 16, of the motor 12. The cathodes $94_{1-3}$ of each of the second thyristors $82_{1-3}$ are electrically coupled in common and further electrically coupled to the second phase winding 162 of the motor 12. The cathodes $100_{1-3}$ of each of the third thyristors $84_{1-3}$ are electrically coupled in common and further electrically coupled to the third phase windings $16_3$ of the motor 12.

The anode $86_1$ of thyristor $80_1$, the anode $92_1$ of thyristor $82_1$ and the anode $98_1$ of the thyristor $84_1$ are electrically coupled in common, with this common connection being adapted for application of the first phase voltage $v(t+\phi_1)$ on mainline $18_1$ to be applied thereto. The anode $86_2$ of the thyristor $80_2$, the anode $92_2$ of the thyristor $82_2$ and the anode $98_2$ of the thyristor $84_2$ are electrically coupled in common, with this common connection being adapted for application of the second phase voltage $V(t+\phi_2)$ on the second mainline $18_2$. The anode $86_3$ of the thyristor $80_3$, the anode $92_3$ of the thyristor $82_3$ and the anode $98_3$ of the thyristor $84_3$ are electrically coupled in common, with this common connection being adapted for application of the third phase voltage $v(t+\phi_3)$ on the third mainline $18_3$. The neutral reactor 26 is coupled as hereinabove describe between the star point 39 and the neutral line $18_N$.

The controller 24' develops first control signals for application to each of the first gates $90_{1-3}$, second control signals for application to the second gates $96_{1-3}$ and third control signals for application to the third gates $102_{1-3}$. The controller 24' operates similarly to controller 24 described above in reference to FIG. 2 with the differences described below.

Figure 7:
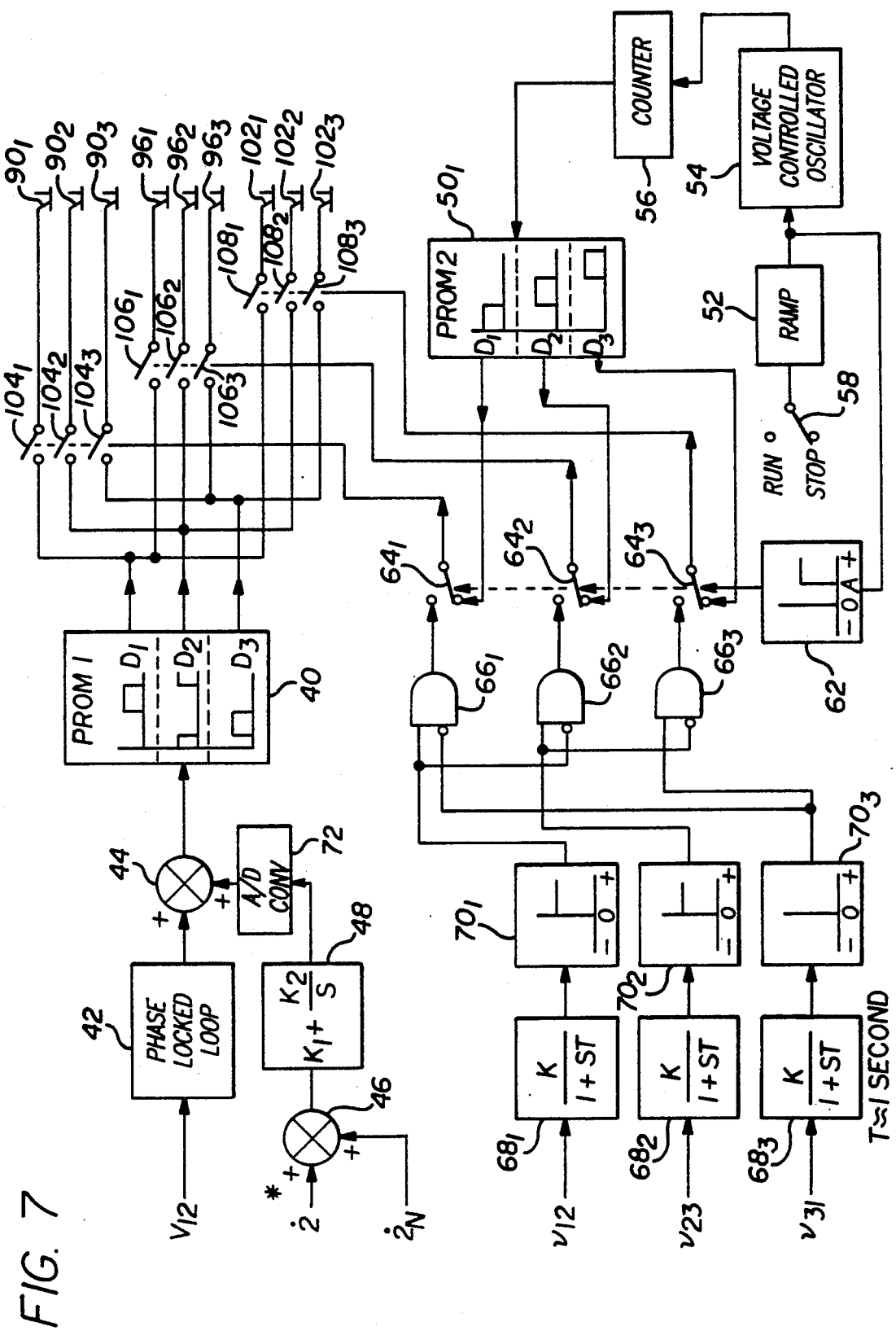
FIG. 7 is a schematic block diagram of the controller shown in FIG. 6.

With reference to FIG. 7, there is shown a schematic block diagram of the controller 24'. Elements identified by the identical reference numerals as set forth in the controller 24 described above are identical thereto and need not be further described. However, the signals developed at the outputs $D_{1-3}$ of the second PROM 50' for low angular velocity and the outputs of the gates $66_{1-3}$ are used to trip respectfully switches $104_{1-3}$, switches $106_{1-3}$ and switches $108_{1-3}$ to apply the first gate signals to gates $90_{1-3}$, the second gate signals to gates $96_{1-3}$ and the third gate signals to the third gates $102_{1-3}$. Thus, it is seen that each phase winding $16_{1-3}$ has its own current inverter instead of sharing the output of a single current inverter with other phase windings. The thyristors of FIG. 6 have a less demanding duty cycle and allows more secure commutation and somewhat simpler control. The symmetrical structures of FIG. 6 are attractive from the point of view of manufacturing because it lends itself to the use of modular sub assemblies. These sub assemblies may then be transportable for use on several motors.

There has been described above a novel converter for starting a three phase synchronous motor. It is obvious that those skilled in the art may now make numerous uses of and departures from the present described embodiments without departing from the inventive concepts disclosed herein. For example, as the load on motor 12 is increased, the slope of the ramp circuit 52 may be decreased for slowing the starting cycle of the controller 24 or 24' to permit the motor 12 to overcome the load. Accordingly, the present invention is to be described solely by the scope of the following claims.

We claim:

1. A converter for starting a three phase synchronous motor from a three phase input power source wherein said motor has a first phase winding, a second phase winding and a third phase winding and further wherein said power source has a first mainline carrying a first phase of said power, a second mainline carrying a second phase of said power, a third mainline carrying a third phase of said power and a neutral line, said converter comprising:

a star point neutral termination coupling said first phase winding, said second phase winding, and said third phase winding to said neutral line;

means for rectifying said first phase, said second phase and said third phase of said input power and for summing each of said rectified phase to develop a starting current having a substantial DC component;

means for applying said starting current sequentially to each of said first phase winding, said second phase winding, and said third phase winding at a continuously increasing frequency so that an angular velocity of said motor synchronously increase with said increasing frequency, said starting current being removed when said angular velocity is synchronous with the constant frequency of said input power.

said applying means including a plurality of second thyristors, each of said second thyristors having a n anode, a cathode, and a gate, said anode of each of said second thyristors being electrically coupled in common to which said starting current is applied, said cathode of each of said second thyristors being coupled to a respective one of said first phase winding, said second phase winding and said third phase winding;

means for developing a plurality of second gate control signals, each of said second gate signals being applied to said gate of a respective one of said second thyristors to fire said respective one of said second thyristors, said second gate signals being developed sequentially at said continuously increasing frequency so that each of said second thyristors couples said starting current to said respective one of said first phase winding, said second phase winding, and said third phase winding to increase said angular velocity synchronously with said frequency; and said developing means including a plurality of filters, each of said filters developing a filtered voltage in response to a respective voltage difference between said first phase windings, said second phase winding and said third phase winding, a plurality of first gates, said filtered voltage of each of said filters being applied to a respective one of said first gates, said first gates developing a gate voltage when said filtered voltage is positive, and a plurality of second gates, each of said second gates having a non-inverting input coupled to a respective one of said first gates for application of said gate voltage thereto and an inverting input coupled to a prior sequential one of said first gates for application of said gate voltage thereto, said second gates each developing one of said gate signals when said gate voltage of said respective one of said first gates is high and said gate voltage of said prior sequential one is low.

2. A converter as set forth in claim 1 wherein said rectifying means includes:
- a plurality of first thyristors, each of said first thyristors having an anode, a cathode and a gate, said anode of each of said first thyristors being coupled electrically to a respective one of said first mainline, said second mainline and said third mainline, said cathode of each of said first thyristors being electrically coupled in common at which said starting current is developed; and
- means for developing a plurality of first gate control signals, each of said first gate signals being applied to said gate of a respective one of said first thyristors, said gate signals being timed to rectify a voltage at said anode of each of said first thyristors.

3. A converter as set forth in claim 2 wherein said developing means includes:
- a first memory element having a plurality of outputs, each of said outputs being electrically coupled to a respective one of said gates, each of said outputs sequentially developing a first gate signal to trigger sequentially a respective one of said first thyristors; and
- means for developing a first address for accessing contents of said first memory element.

4. A converter as set forth in claim 3 wherein said first address developing means includes:
- a phase locked loop responsive to a voltage difference between two of said first mainline, said second mainline and said third mainline to develop a digital angular output signal;
- a first summer to sum a constant reference current with a negative of a measured current in said neutral line thereby developing a summed signal;
- a filter to filter said summed signal to develop a filtered signal;
- an analog-to-digital converter to convert said filtered signal to a digitized format;
- a second summer to sum said digital angular output signal and said digitized filtered signal to develop a first address; and said first memory element having a look-up table which generates said gate signal in response to said first address.

5. A converter for synchronous motor starting comprising:
- a plurality of first thyristors, each of said first thyristors having an anode, a cathode and a gate, said anode of each of said first thyristors being adapted to have a respective phase voltage of polyphase power input power applied thereto;
- a plurality of second thyristors, each of said thyristors having an anode, a cathode and a gate, said anode of second thyristors being electrically coupled to said cathode of said first thyristors, said cathode of each of said second thyristors being adapted to be coupled electrically to a respective phase winding of a synchronous motor;
- a start point node coupling each said respective phase winding;
- a controller which develops first gate signals and second gate signals, each of said first gate signals being applied to said gate of a respective one of said first thyristors and each of said second gate signals being applied to said gate of a respective one of said second thyristors, said first gate signals being developed so that each of said first thyristors rectify said respective phase voltage of said input power to develop a starting current, said second gate signals being sequentially developed at a continuously increasing frequency so that each of said second thyristors couples said starting current to said respective phase winding to increase an angular velocity of said motor synchronously with said increasing frequency;
- a neutral reactor adapted to be coupled electrically to said star point node of said motor to attenuate current harmonics, wherein said starting current passes through said star point node; and
- wherein said controller includes:
  - a plurality of filters, each of said filters developing a filtered voltage in response to a respective voltage difference between two selected phase windings of said motor;
  - a plurality of first gates, said filtered voltage of each of said filters being applied to a respective one of said first gates, said first gates developing a gate voltage when said filtered voltage is positive; and
  - a plurality of second gates, each of said second gates having a non-inverting input coupled to a respective one of said first gates for application of said gate voltage thereto and an inverting input coupled to a prior sequential one of said first gates for application of said gate voltage thereto, said second gates each developing one of said gate signals when said gate voltage of said respective one of said first gates is high and said gate voltage of said prior sequential one is low.

* * * * *